Sept. 9, 1930.  L. G. KERNS  1,775,562
FRUIT PICKER
Filed April 3, 1928
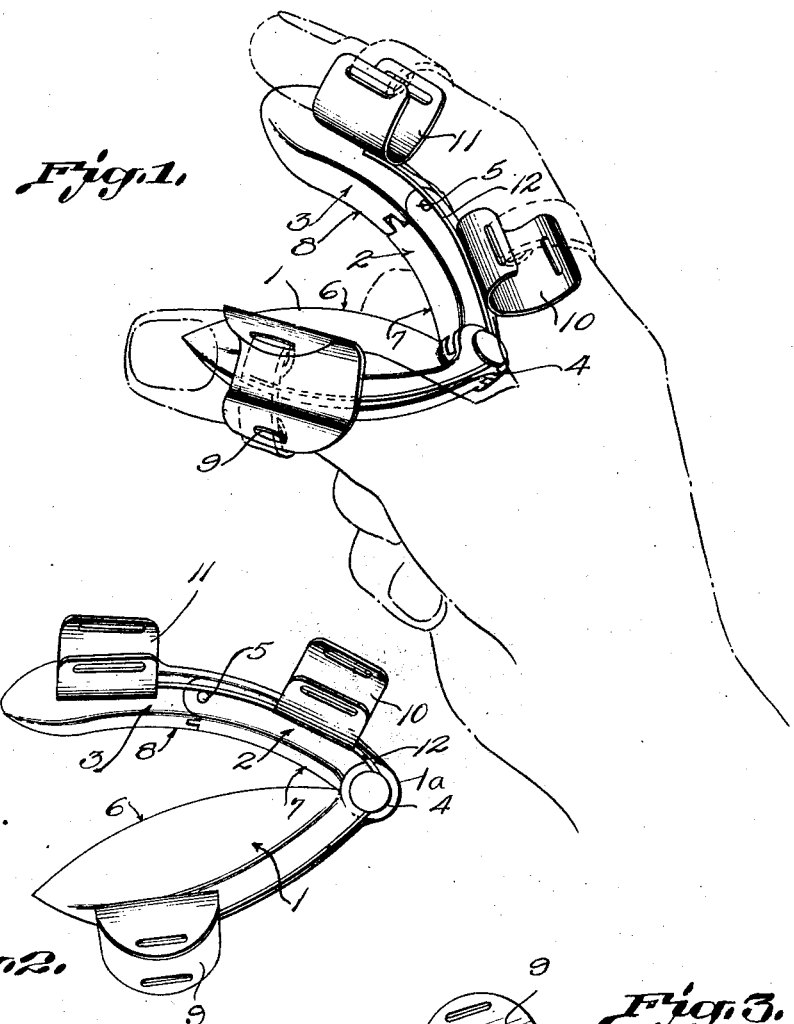

Patented Sept. 9, 1930

1,775,562

UNITED STATES PATENT OFFICE

LEANDER G. KERNS, OF YELM, WASHINGTON

FRUIT PICKER

Application filed April 3, 1928. Serial No. 266,999.

My invention relates to improvements in fruit pickers, and it consists in the constructions, arrangements and combinations herein described and claimed.

It is an object of the invention to provide a fruit picker of such character as to permit picking of the fruit by severing the stem.

A further object of the invention is the provision of a fruit picker in the form of shears, which is readily applicable to the index finger and thumb of an operator.

A still further object of the invention is the provision of a picker operable in a manner similar to a pair of shears, one of the cutting blades having a portion of the blade hingedly connected and functioning as a hook for drawing the stem of the fruit into cutting engagement.

Additional objects, advantages and features of invention will be apparent from the following description, considered in conjunction with the accompanying drawings, wherein, Figure 1 is a perpective view of my fruit picker as applied to the hand of an operator, Figure 2 is a plan view of the picker, Figure 3 is a bottom view illustrating the cutting blades in closed position.

In carrying out my invention I provide a blade 1 having a cutting edge 6 and finger hold 9. One extremity of the blade 1 has an ear 1ª. A blade 2 is hinged to the ear 1ª as at 4, this blade being approximately one-half the length of the blade 1, and terminates in a hinge 5, to which there is hingedly connected a blade 3. The blades 2 and 3 each have cutting edges 7 and 8 respectively, and at the opposite edges, finger holds 10 and 11 are provided.

A U-shaped spring 12 is secured beneath the finger-hold 9 and around the pivot 4, from whence it is extended behind the finger holds 10 and 11, as clearly illustrated in Fig. 1. The spring 12 normally holds the blades 1, 2 and 3 in open position, as indicated in Fig. 1.

The blade 1 and the combined length of the blades 2 and 3, are preferably of such length as to be readily grasped between the fore-finger and the thumb of an operator, when in use. The hinge 5 is preferably positioned so as to assume a position directly opposite the second joint of the index finger of an operator, when applied.

The finger-holds 9, 10 and 11 are suitably slotted for engagement of securing straps, as indicated in dotted lines in Fig. 1.

In the use of my device, the picker is positioned between the thumb and forefinger of the hand of an operator, as indicated in Fig. 1. In this position, the thumb is engaged within the finger-hold 9 while the index finger is inserted within the finger-holds 10 and 11. To clip the stem of fruit, it is only necessary to position the blades 1 and 2 around the stem, bringing the blades 1 and 2 toward each other, by manipulation of the thumb and index finger.

It is often that fruit will be suspended just beyond the reach of an operator so that a good cutting action cannot be had. In such cases, by bending the index finger at the second joint, the stem of the fruit is swung inwardly toward the hinge 4. Now, if the thumb is bent toward the index finger, the cutting edge 6 will engage the stem resting against the cutting edge 7 or 8, as the case may be, and the stem thus severed. It will thus be seen that by providing the hinged blades 2 and 3 a hook action is provided whereby stems of fruit may be drawn to a position affording the most efficient cutting action.

I claim:—

1. A fruit picker comprising a pair of hingedly connected blades, and finger-holds carried by said blades, one of said blades consisting of two blade portions joined by a hinge connection to fit the finger of an operator for bending movement therewith during engagement with the fruit stems.

2. A fruit picker comprising a pair of hingedly connected blades, finger-holds for said blades, one of said blades consisting of two blade portions joined by a hinge, and resilient means normally holding the blade portions of said last named blade in longitudinal alinement.

3. A fruit picker comprising a pair of hingedly connected cutting blades, one of said blades consisting of two blade portions joined by a hinge connection, finger-holds on said blade disposed on opposite sides of said hinge conection, whereby bending of an engaged finger will cause swinging of said blade at the hinge joint, and a spring normally holding the blade portions of said blade in longitudinal alignment.

4. A fruit picker comprising a pair of hingedly connected cutting blades, finger-holds for said blades, one of said blades consisting of two blade portions joined by a hinge intermediate its length, and a U-shaped spring confined between said finger-holds whereby to hold the blade portions of said blades in normal open position and said hinged blade in longitudinal alignment.

LEANDER G. KERNS.